J. W. PROMENSCHENKEL.
EAR SNAPPING AND CORN HUSKING MACHINE.
APPLICATION FILED APR. 28, 1919.
1,344,563.
Patented June 22, 1920.
8 SHEETS—SHEET 3.
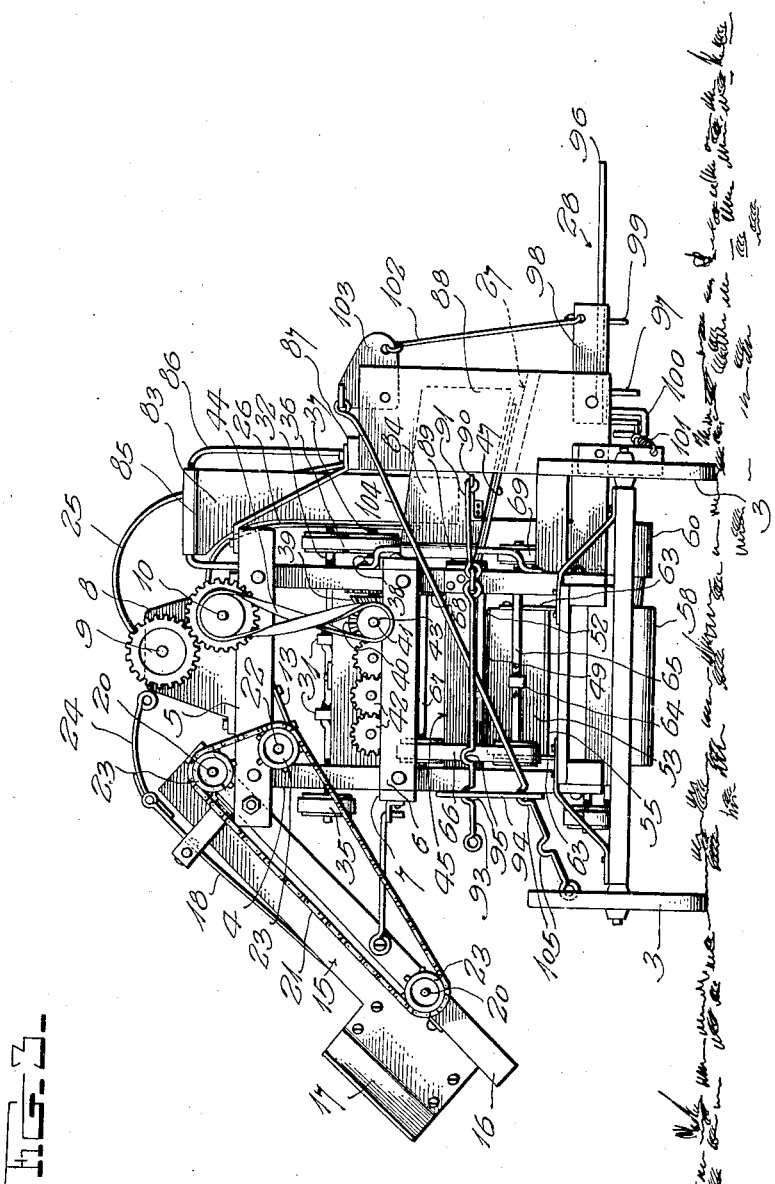
Witness
H. Woodard
Inventor
J. W. Promenschenkel,
By
H. B. Willson & Co.
Attorneys

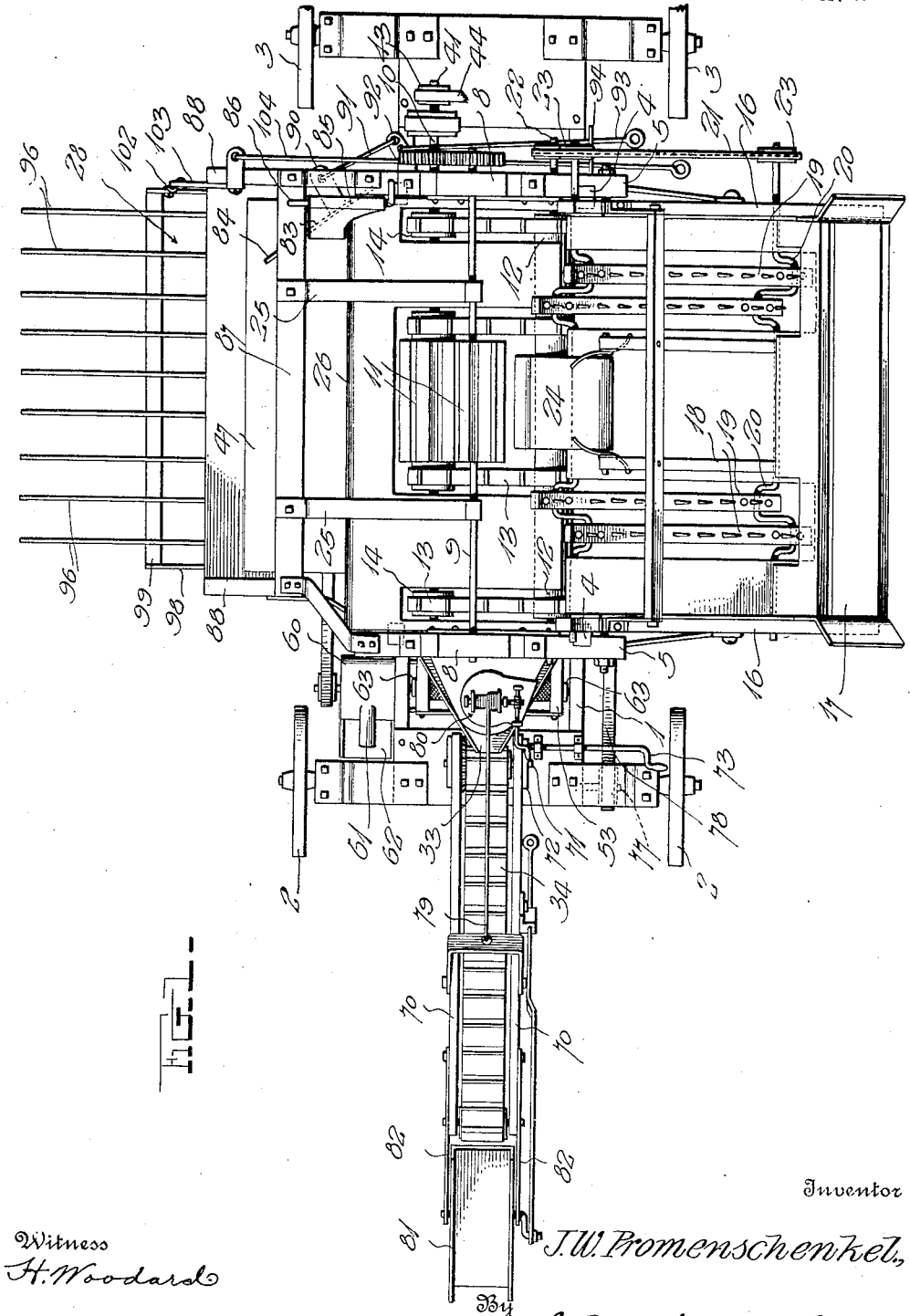

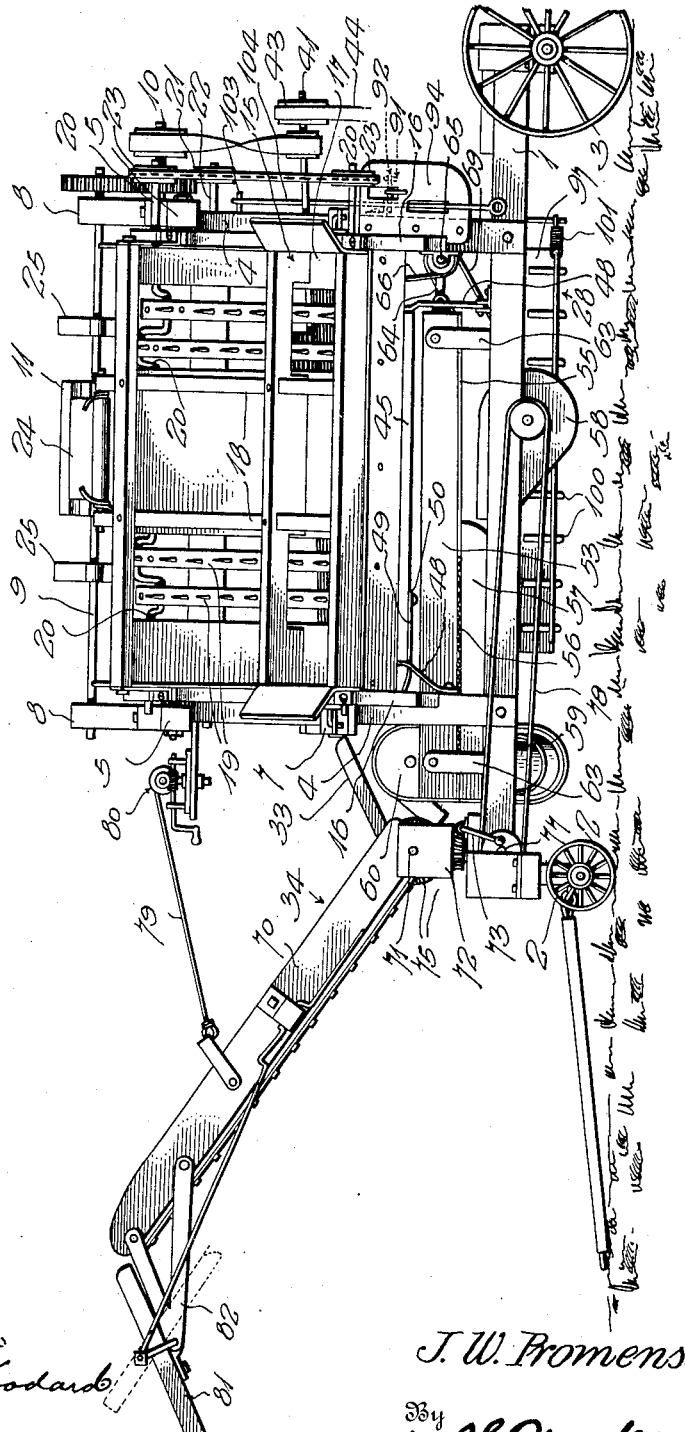

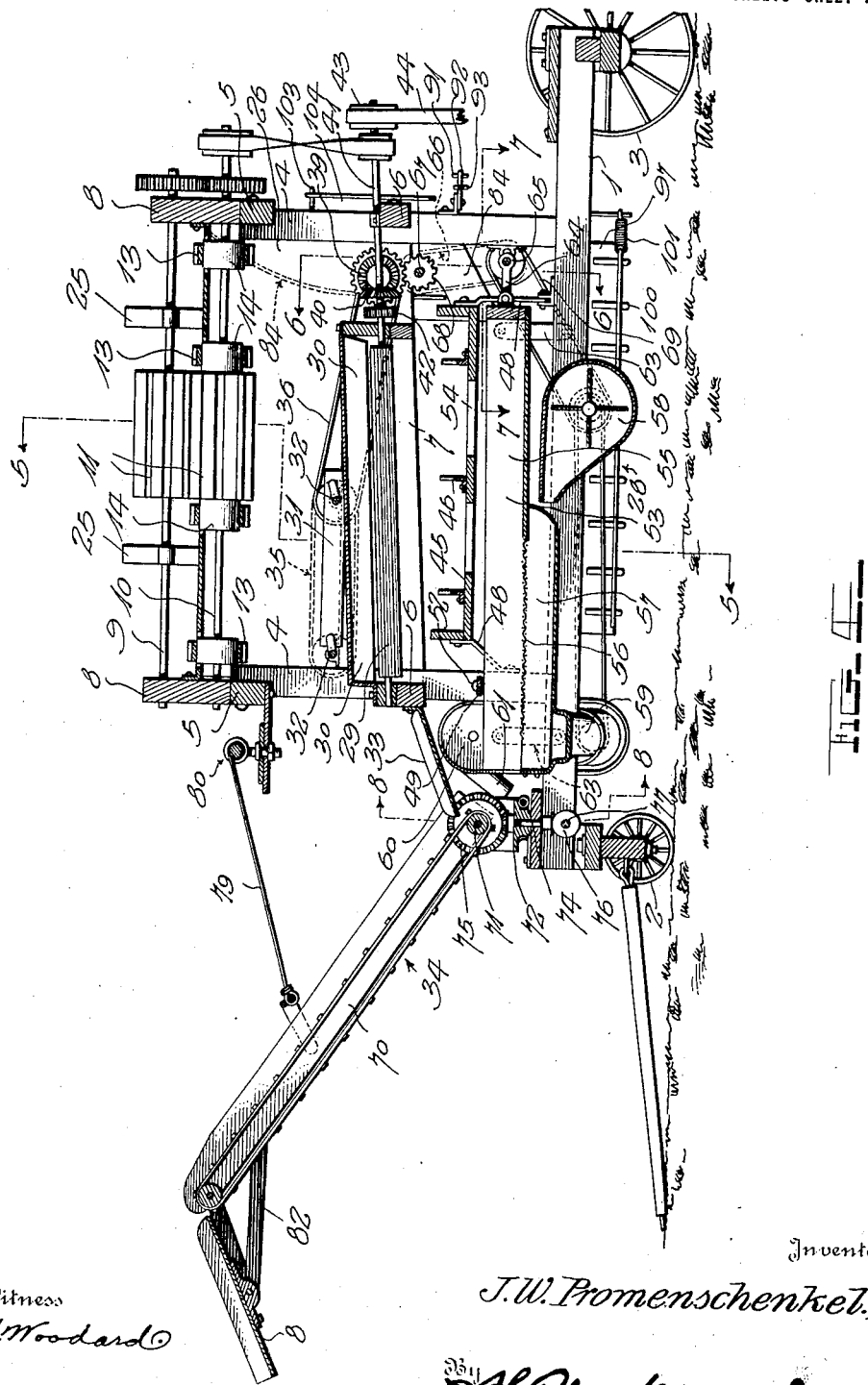

J. W. PROMENSCHENKEL.
EAR SNAPPING AND CORN HUSKING MACHINE.
APPLICATION FILED APR. 28, 1919.
1,344,563.
Patented June 22, 1920.
8 SHEETS—SHEET 5.
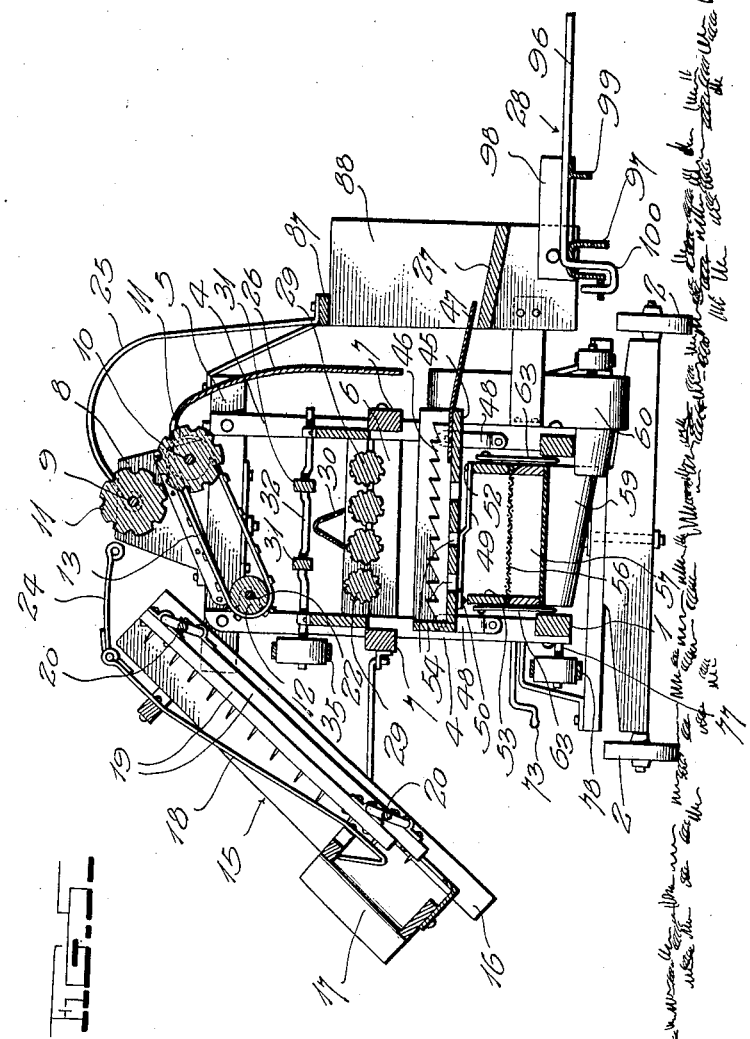
Witness
H. Woodard
Inventor
J. W. Promenschenkel,
By
H. R. Wilson & Co.
Attorneys

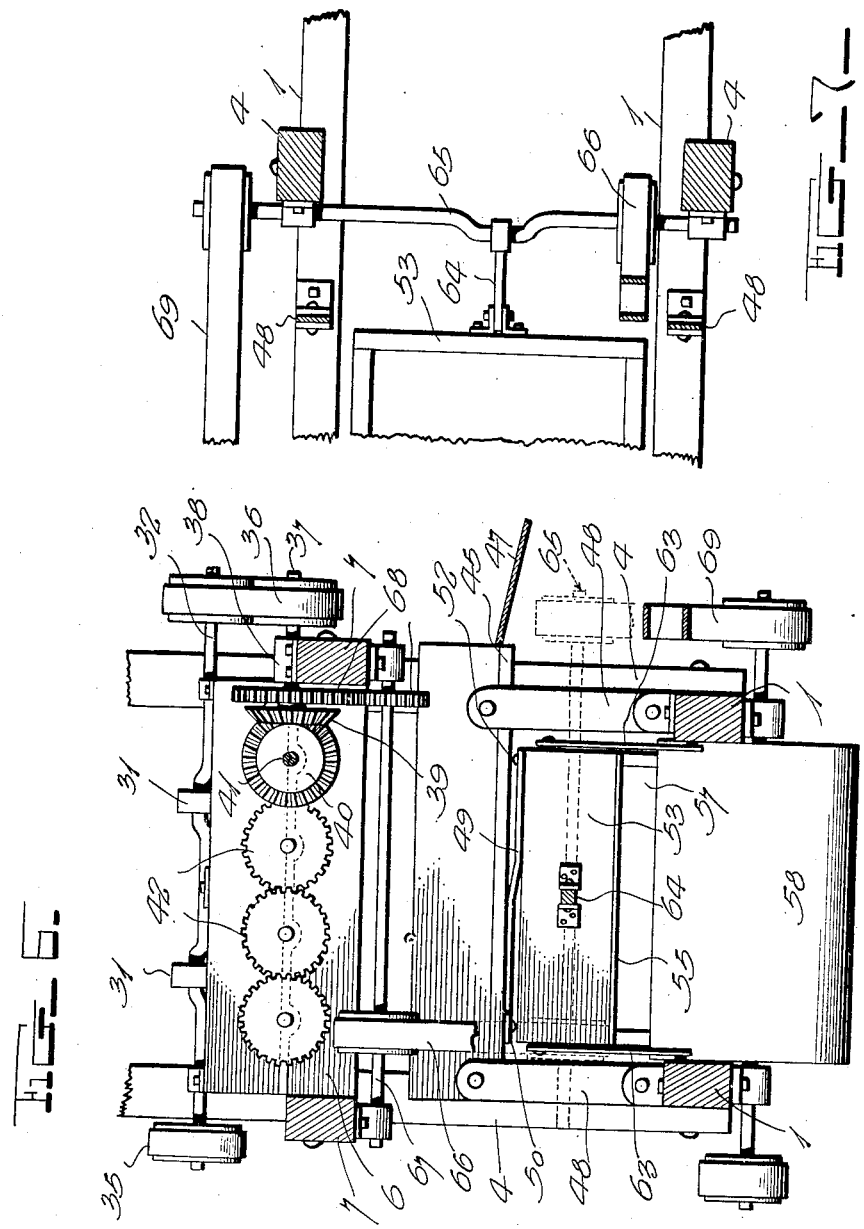

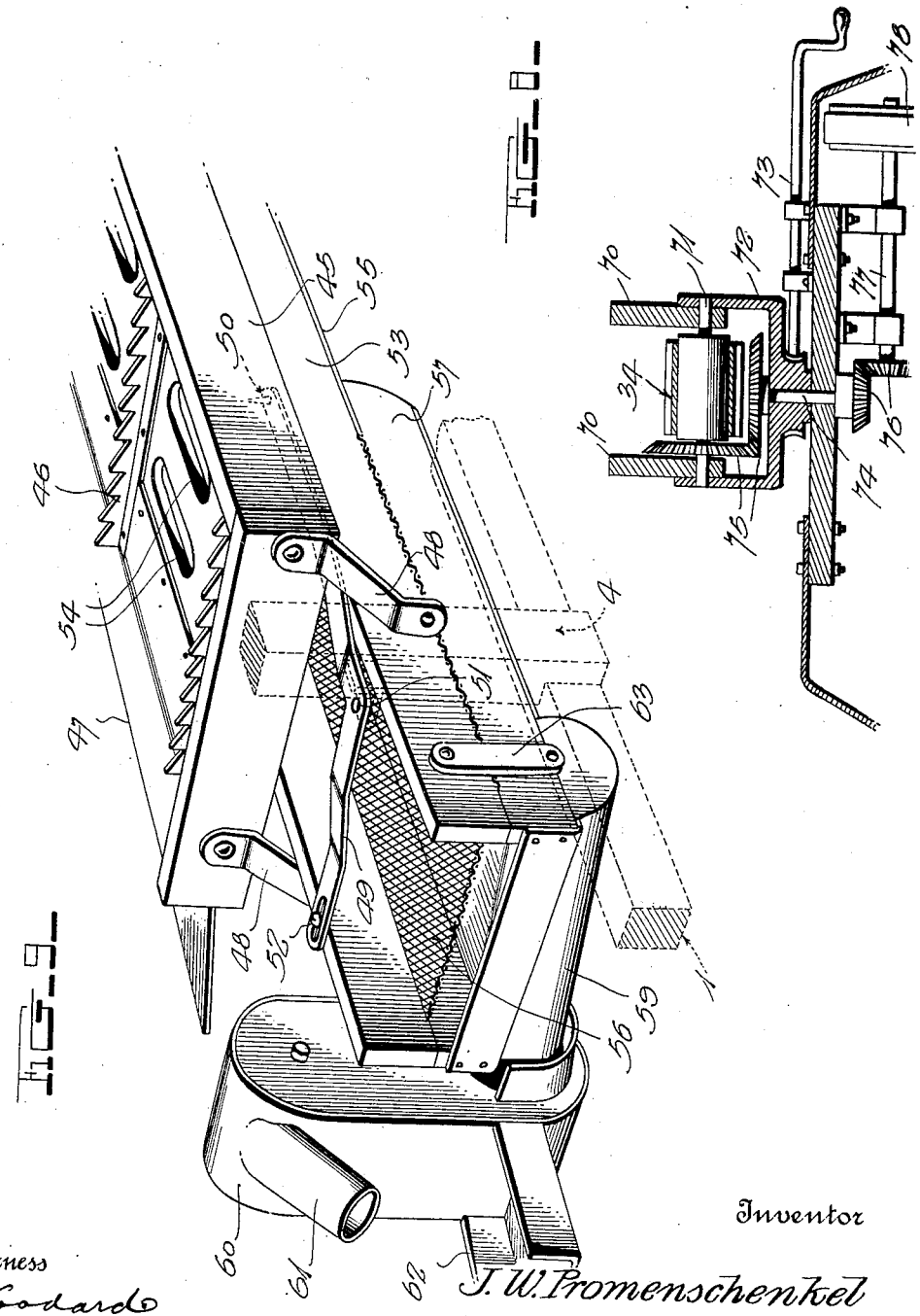

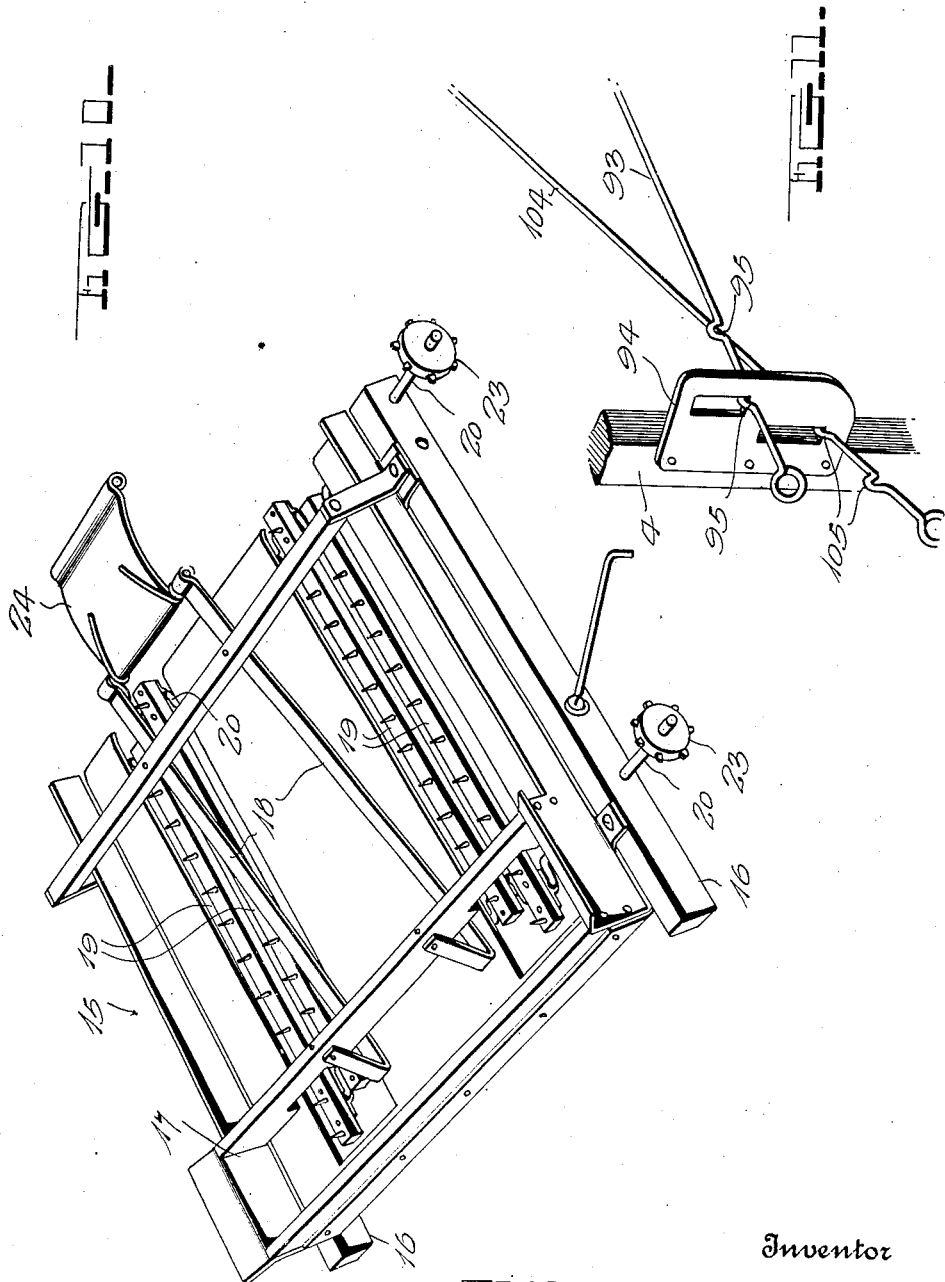

UNITED STATES PATENT OFFICE.

JOSEPH W. PROMENSCHENKEL, OF SHELBY, OHIO.

EAR-SNAPPING AND CORN-HUSKING MACHINE.

1,344,563.  Specification of Letters Patent.  Patented June 22, 1920.

Application filed April 28, 1919. Serial No. 293,060.

*To all whom it may concern:*

Be it known that I, JOSEPH W. PROMENSCHENKEL, a citizen of the United States, residing at Shelby, in the county of Richland and State of Ohio, have invented certain new and useful Improvements in Ear-Snapping and Corn-Husking Machines; and I do declare the following to be a full, clear, and exact description of the invention, such as will enable others skilled in the art to which it appertains to make and use the same.

My invention has for its principal object to provide a comparatively simple and inexpensive, yet a highly efficient and reliable machine for snapping the ears from corn stalks, removing the husks from such ears, discharging the husked ears into a wagon or the like and any loose grains into sacks or other receptacles, blowing all dust from such loose grains, and discharging the husks and fodder together for tying.

With the foregoing and other objects in view, the invention resides in the novel features of construction and unique association of parts hereinafter fully described and claimed, the descriptive matter being supplemented by the accompanying drawings.

Figure 1 is a top plan view of a machine constructed in accordance with my invention.

Fig. 2 is a side elevation.

Fig. 3 is an end view.

Fig. 4 is substantially a central longitudinal section.

Fig. 5 is a vertical transverse section on the plane indicated by the line 5—5 of Fig. 4.

Fig. 6 is a transverse section on the plane of the line 6—6 of Fig. 4.

Fig. 7 is a horizontal section on the plane indicated by the line 7—7 of Fig. 4.

Fig. 8 is a detail transverse section on the plane of the line 8—8 of Fig. 4.

Fig. 9 is a perspective view of the separator for the husks and shelled corn, and the screening and discharge means for the latter.

Fig. 10 is a perspective view of the self-feeder for the machine.

Fig. 11 is a perspective illustrating certain controlling means to be described.

In the drawings above briefly described, the numeral 1 designates a main horizontal frame mounted on front and rear wheels 2 and 3. Four corner posts 4 rise from the frame 1 and are connected at their upper ends by transverse bars 5, and between their ends by other transverse bars 6 and longitudinal bars 7.

In suitable bearings 8 carried by the upper transverse bars 5, are two longitudinal shafts 9 and 10 disposed one above the other and carrying rollers 11 which are adapted to snap the ears of corn from the stalks. The shaft 10 is disposed near the right hand or discharge side of the machine and near the other side thereof and mounted in suitable bearings on two of the posts 4, is a roller 12. Spaced endless belts 13 are trained around the roller 12 and around the pulleys 14 on the shaft 10 and travel in such direction as to feed the corn between the snapping rollers 11, said corn being discharged onto the belts 13 by a self-feeding mechanism 15.

The mechanism 15 includes a frame 16 having at its lower end a hopper 17 into which the corn stalks are thrown from the shocks, said stalks being carried upwardly from the hopper beneath guide bars 18, by toothed feed bars 19 which are operated by crank shafts 20. A sprocket chain 21 or a belt is used for driving the two shafts 20 and the shaft 22 of the roller 12 above described, said chain or belt passing around sprockets or pulleys 23 on said shafts as seen clearly in Fig. 3. A pivoted plate 24 is preferably carried by the upper ends of bars 18 to effectively guide the stalks of corn onto the belts 13 so that the latter will feed said stalks between the rollers 11. These rollers snap the ears from the stalks and the latter are discharged between arched guide bars 25 and a vertical plate 26, onto a suitable deck 27 in connection with which a tying mechanism (not shown) may be used. From the deck, the tied bundles of stalks and husks are dropped onto a bundle carrier 28 which may be dumped when a predetermined number of bundles have been deposited thereon.

The ears of corn removed from the stalks by the rollers 11, fall between the belts 13 onto a series of longitudinally inclined husking rollers 29, being properly guided to said rollers by an arched longitudinal guide 30 disposed over the two central rollers as depicted clearly in Figs. 4 and 5. A pair of longitudinal bars 31 which are moved vertically and longitudinally by transverse crank shafts 32, serve to press the ears downwardly against the rollers 29 and to feed such ears toward the lower ends of the rollers. During this process, the husks are removed from the ears and are discharged between the rollers 29, while the husked ears fall from the rollers onto a chute 33 and are carried from the latter into a wagon or the like by a conveyer 34.

The two crank shafts 32 are connected for rotation in unison, by a belt 35 and pulleys or by sprockets and a sprocket chain. A belt or chain 36 is employed for driving one of the shafts 32 from a short transverse shaft 37 which is mounted in a suitable bearing 38 on one of the side bars 7. Shaft 37 carries a bevel gear 39 meshing with a similar gear 40 on a main longitudinal drive shaft 41 which carries one of the rollers 29, and the remaining rollers 29 are driven from shaft 41 by intermeshing spur gears 42 (see Figs. 4 and 6). The shaft 41 is shown provided with a drive pulley 43 and belt 44 by means of which it may be driven from a gas engine or the like (not shown).

From the husking rollers 29 the husks and any grains of corn which may be removed from the ears, fall onto a transversely vibrating tray 45 which is provided with toothed transverse feed bars 46 to discharge the husks onto the deck 27, said tray having secured thereto an auxiliary deck 47 which vibrates therewith to effectively discharge the husks upon said deck 27 to be tied into bundles with the corn stalks from the rollers 11.

The tray 45 is mounted on pivoted legs 48, and although said tray could well be vibrated in any preferred manner, I preferably employ a bell crank lever 49 pivoted to said tray at 50, fulcrumed on one of the posts 4 at 51, and pivoted at 52 to a longitudinal screen frame 53 which is located directly beneath said tray, the latter being provided with slots or the like 54 through which any shelled corn is discharged onto the bottom of the screen frame 53. This bottom as seen more particularly in Figs. 4 and 9, may consist of a solid portion 55 and a screen section 56. Below the section 56 is an air channel 57 at one end of which a blower 58 is located, said blower and channel serving to direct a strong blast of air through the screen 56 and the corn thereon to remove any dust, flakes of husk, etc. The clean corn falls into a transverse chute 59 and is discharged from the latter into a conveyer 60, said conveyer having an outlet 61 for discharging the grain into sacks or other receptacles which may well rest upon the support 62.

The screen frame 53 is mounted for longitudinal vibration on pivoted legs 63 and a pitman 64 connects one end of said screen frame with a transverse crank shaft 65. This shaft is driven by a belt or the like 66 from a transverse shaft 67 which is here shown as operated by gears 68 from the shaft 37. A belt 69 may be provided for driving the blower 58 from the shaft 65.

The conveyer 34 above described, includes side members 70 pivotally mounted for vertical swinging on a short transverse shaft 71 which is carried by a fork 72, this fork being mounted for horizontal turning on the front end of the frame 1, and suitable worm gearing driven by the crank 73, may well be provided for swinging said fork and the conveyer 70 from side to side as required. A short vertical shaft 74 forms the pivot of the fork 72 and by means of gearing 75, drives the conveyer 34, and by suitable gearing 76, said shaft is driven by a short transverse shaft 77 which may be operated by any preferred means such as a belt 78 leading to the blower 58. A cable 79 and drum 80 are preferably employed for raising and lowering the frame of the conveyer 34, and in order that the ears of corn may be discharged by this conveyer into either the front or rear end of the wagon, a pivoted chute 81 is mounted on brackets 82 for inclination downwardly and forwardly or downwardly and rearwardly, as required.

Preferably used in conjunction with the features above described, for guiding either short or long corn stalks onto the deck 27, are two guide plates 83 and 84, located at one end of said deck. The plate 83 is pivoted on a horizontal axis 85 at its upper end, preferably on a U-shaped frame 86 extending from one of the end bars 5 to a longitudinal bar 87 which is supported by vertical end boards or the like 88 rising from the deck. The plate 83 extends from the frame 86 to a point adjacent the lower end of the guide plate 26 and extends outwardly from this plate as seen clearly in Figs. 1 and 3, and the lower end of said plate 83 rests against the inner side of the plate 84. This plate extends laterally outward above the deck of the machine and is pivoted at its inner end on a vertical axis as indicated at 89. A crank arm 90 extends outwards from the plate 84 and is connected by a link 91 to a pivoted arm 92 mounted on one of the posts 4, and a horizontal rod 93 extends from said arm through a slot in a plate 94, said rod being provided with arched portions 95 for engagement with the end of the slot in order that said rod may be held in different adjusted positions (see Figs. 1, 3 and 11). By pushing rod 93 inwardly, plate 84 is swung inwardly and movement of this plate similarly moves the other plate 83, thus adapting the machine for operation upon rather short corn stalks. By pulling the rod in the other direction however the plates are swung outwardly and will then serve to guide longer stalks onto the deck.

Although the bundle carrier 28 could be of any preferred construction, it preferably includes lateral tines 96 which are pivoted at their inner ends to a longitudinal bar 97 which is carried by pivoted transverse bars 98, supporting another longitudinal bar 99 which underlies the tines between their ends. An arrangement of cranks 100 and a spring 101 are employed to normally hold the tines 96 in proper position, and to permit rearward swinging of said tines when the carrier 28 is dumped and the tines come in contact with the ground. It is thus insured that breakage of the tines shall not occur.

For normally supporting and holding the load carrier 28 against dumping, a link 102 preferably rises from one of the bars 98 to a bell crank 103 mounted on one of the end boards 88, and a rod 104 extends from said bell crank through a slot in the plate 94, being provided with arched portions 105 for holding said rod in either position to which it may be shifted.

In operation, the corn is thrown from the shocks into the hopper 17 and is carried from this hopper by the feed bars 19. These bars discharge the corn onto the belts 13 and the latter feed it between the snapping rollers 11. The corn stalks fall between the guide bars 25 and the plate 26 onto the deck of the machine and the unhusked ears drop onto the husking rollers 29. The bars 31 retain the ears in proper relation with the rollers and at the same time feed them toward the lower ends of said rollers, the husks being in the meantime removed. The husked ears of corn slide down the chute 33 on the conveyer 34 and are delivered by the latter either into the front or rear end of the wagon, according to the position of the chute 81. The husks and any grains of corn which may have been loosened by the husking rollers, fall onto the tray 45, the husks being discharged from said tray onto the deck 27 for binding with the fodder, while the grains of corn fall through the slots 54 onto the bottom of the screen frame 53. As the corn travels over the screen 56, the current of air from the blower 58 and channel 57 effectively cleans such corn and it is then discharged into the chute 59. From the chute 59, the corn is elevated by the conveyer 60 and discharged at 61 into a sack or the like which rests upon the support 62. When the bundles of stalks and husks have accumulated to the desired extent upon the bundle carrier 28, the rod 104 is operated to dump the load and the carrier is then returned to receiving position. The machine is readily portable and may be easily drawn over the field from one shock to another as the husking is accomplished.

From the foregoing, taken in connection with the accompanying drawings, it will be seen that although my invention is of comparatively simple and inexpensive nature, it will be highly efficient and in every way desirable. Good results can be obtained by using the general features of construction and arrangement shown and described, but it is to be understood that the present disclosure is for illustrative purposes only and that numerous minor changes may be made within the scope of the invention as claimed.

I claim:

1. A machine of the class described comprising a base, a frame rising from said base, vertically spaced snapping rollers at the upper end of said frame, means for feeding stalks of corn to said snapping rollers, a deck extending laterally from the lower portion of said frame, a substantially vertical guard plate extending from the lower snapping roller to a point adjacent said deck, and arched guide bars having depending ends spaced outwardly from said guard plate and extending from the upper snapping roller to points adjacent the lower end of said guard plate, said plate and bars serving to guide the fodder from said snapping rollers to said deck.

2. A machine of the class described comprising an upstanding frame having means at its upper end for snapping ears from stalks, a deck extending laterally from said frame below said snapping means, means for guiding the stalks from said snapping means to said deck, including a substantially vertical guard plate at one side of the frame with its lower edge spaced upwardly from the deck, ear-husking means mounted on said frame between said guard plate and the opposite side of the frame, and means for feeding the husks under the lower edge of said guard plate and discharging them onto said deck.

3. A machine of the class described comprising an upstanding frame having means at its upper end for snapping ears from stalks, a deck extending laterally from said frame below said snapping means, means for guiding the stalks from said snapping means to said deck, including a substantially vertical guard plate at one side of the frame with its lower edge spaced upwardly from the deck, ear-husking means mounted on said frame between said guard plate and the opposite side of the frame, and discharge means for the husks, including a horizontal plate extending beneath said guard plate to said deck, said horizontal plate and said guard plate co-acting in forming an outlet for directing the husks onto the deck.

4. A machine of the class described comprising a frame, means at the upper end of said frame for snapping ears of corn from the stalks, a deck extending laterally from the lower portion of said frame, a guide plate extending downwardly from said snapping means to guide the fodder therefrom to said deck, a second guide plate disposed vertically at one end of said first named guide plate, said second plate being pivotally mounted at its upper end for swinging longitudinally of said first named plate and extending outwardly from the latter, a third guide plate at said end of said first named plate and pivotally mounted for horizontal swinging, said third guide plate resting against the outer side of said second guide plate for moving the latter, and means for swinging said third plate upon its pivot and holding it in adjusted position.

In testimony whereof I have hereunto set my hand.

JOSEPH W. PROMENSCHENKEL.